United States Patent [19]
Gadkaree et al.

[11] Patent Number: 6,097,011
[45] Date of Patent: Aug. 1, 2000

[54] ELECTRICALLY HEATABLE ACTIVATED CARBON BODIES FOR ADSORPTION AND DESORPTION APPLICATIONS

[75] Inventors: Kishor P. Gadkaree, Big Flats; Brian P. Tyndell, Addison, both of N.Y.

[73] Assignee: Corning Incorporated, Corning, N.Y.

[21] Appl. No.: 08/964,117

[22] Filed: Nov. 4, 1997

Related U.S. Application Data

[63] Continuation of application No. 08/249,897, May 26, 1994, abandoned.

[51] Int. Cl.⁷ .............................. B60L 1/02; H05B 3/10; B32B 3/12
[52] U.S. Cl. .................... 219/553; 219/202; 428/116; 502/527.19
[58] Field of Search ..................... 219/201, 202, 219/205, 206, 543, 544, 553; 392/491, 493, 494; 55/523, 524, DIG. 5; 95/278, 279, 280, 283; 210/502.1, 506, 509, 510.1; 264/29.5, 29.7; 428/116, 117; 502/80, 85, 87, 401, 402, 429, 439, 527.19

[56] References Cited

U.S. PATENT DOCUMENTS

| | | |
|---|---|---|
| 3,885,977 | 5/1975 | Lachman et al. . |
| 3,956,614 | 5/1976 | Hervert . |
| 3,995,143 | 11/1976 | Hervert . |
| 4,127,691 | 11/1978 | Frost . |
| 4,399,052 | 8/1983 | Sugino . |
| 4,518,704 | 5/1985 | Okabayashi et al. . |
| 4,656,153 | 4/1987 | Wennerberg . |
| 4,800,253 | 1/1989 | Kleiner et al. ............ 219/553 |
| 4,992,319 | 2/1991 | Kurosawa . |
| 4,999,330 | 3/1991 | Bose et al. . |
| 5,043,310 | 8/1991 | Takeuchi et al. . |
| 5,104,540 | 4/1992 | Day et al. . |
| 5,110,328 | 5/1992 | Yokota et al. . |
| 5,215,690 | 6/1993 | Golino et al. . |
| 5,232,882 | 8/1993 | Yoshimoto . |
| 5,510,063 | 4/1996 | Gadkaree et al. . |

OTHER PUBLICATIONS

US serial No. 08/228,265, filed Apr. 15, 1994, now abandoned.

*Primary Examiner*—Sang Paik
*Attorney, Agent, or Firm*—L. Rita Herzfeld

[57] ABSTRACT

An electrically heatable activated carbon body and method of making and using the body. The body is composed of a non-metallic monolithic structure having activated carbon and means for passage of a workstream therethrough; the device is adapted for conducting an electric current therethrough. The body is used in adsorption and desorption applications wherein an electric current is passed through the structure having adsorbed species, to raise the temperature above the desorption temperature of the adsorbed species, to cause desorption of the adsorbed species which then pass out of the structure. The body is preferably an activated carbon coated honeycomb which is fitted with a conducting metal.

48 Claims, 2 Drawing Sheets

US 6,097,011

ELECTRICALLY HEATABLE ACTIVATED CARBON BODIES FOR ADSORPTION AND DESORPTION APPLICATIONS

This application is a continuation of Ser. No. 08/249,897 filed May 26, 1994 now abandoned.

This invention relates to bodies having activated carbon for adsorption and desorption of components from a fluid workstream, and method of making and using them. The body is equipped with conducting means for passage of an electric current therethrough. Passage of the electric current through the body facilitates desorption of the adsorbed gases, thereby regenerating the body for continued use. The conducting means is preferably in the form of thin uniform metal coatings on opposite surfaces of the body for uniform distribution of current through the body and for minimizing contact resistance.

BACKGROUND OF THE INVENTION

Activated carbon is used in gas adsorption applications. Once the adsorption capacity of the activated carbon is completely utilized the carbon has to be regenerated by removing or desorbing the adsorbed species.

The desorption process depends on the adsorption potential for the particular species which in turn is determined by the size of the gas molecule, its polarizability as well as the mean distance between the graphitic platelets in the activated carbon structure. In general, if platelet distance is more than 3 or 4 molecular diameters the adsorption potential is low and so adsorbed species can be desorbed easily. If the distance is less than 3 molecular diameters the adsorption potential is high and the adsorbed species cannot be desorbed easily.

The species which are not adsorbed strongly can be easily desorbed by flowing a current of air at low temperatures. For strongly adsorbed species however, the carbon has to be heated to increase the vapor pressure of the adsorbed gases and decrease the adsorption potential. A current of heated air or steam can be passed through the carbon to desorb the gases.

Typically steam or heated air regeneration has to be carried out in a separate reactor. In applications in which activated carbon has to be repeatedly regenerated, frequent steam or air regeneration is expensive and inconvenient.

Desorption has been carried out on granular carbon beds by passing an electric current through the carbon. However, there are disadvantages to passing an electric current through granulated carbon beds. Because there is no continuous contact between carbon granules, that is, there are open channels between the granules which are necessary for the flow of gases, there is no way to have uniform current flow through the granules. Since resistance varies within the same granular bed along a given flow path and also from path to path, heating can cause hot spots and desorption can occur at different rates. Resistance changes as a function of time due to the unsymmetrical attrition of the granules and therefore is not uniform. As the temperature of the carbon increases, resistance decreases and uncontrolled heating can result which can cause fires.

The magnitude of the electric current through the granular bed at a given cross section depends on the resistance offered by the granules in its path. For example, the more dense the carbon granules, the lower will be the resistance and hence the higher the current through that path for a given applied voltage. This type of situation will lead to hot spots in the bed.

There remains a need to have activated carbon adsorber in a form in which adsorbed gases can be easily, efficiently, safely, and economically desorbed.

The present invention provides such an activated carbon adsorber.

SUMMARY OF THE INVENTION

In accordance with one aspect of the invention, there is provided an electrically heatable activated carbon body composed of a non-metallic monolithic structure having activated carbon and means for passage of a workstream therethrough, and conducting means on the structure for conducting an electric current therethrough.

In accordance with another aspect of the invention, there is provided a method for making the above described electrically heatable activated carbon body which involves providing a non-metallic monolithic structure having activated carbon, and means for passage of a workstream therethrough, and providing electrically conducting means on the structure for conducting an electric current therethrough.

In accordance with another aspect of the invention, there is provided a method for desorbing adsorbed species from an activated carbon body, which involves providing the above described electrically heatable activated carbon body having adsorbed species, passing an electric current through the monolith structure to raise the temperature above the desorption temperature of the adsorbed species to cause desorption of the adsorbed species which then pass out of the structure.

DETAILED DESCRIPTION OF THE INVENTION

Figure 1:
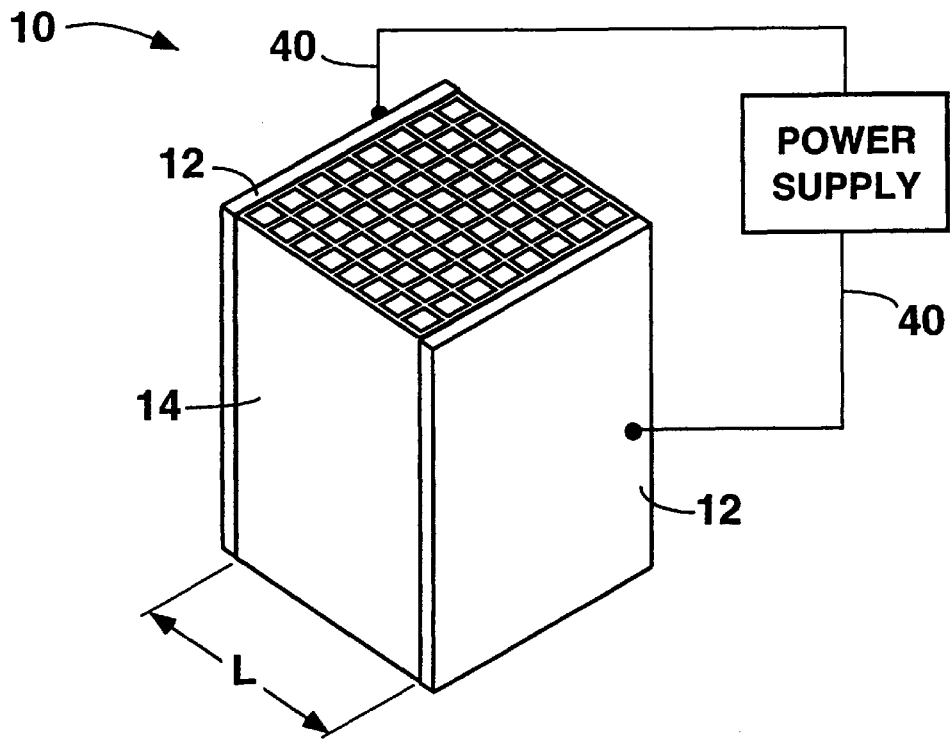
FIG. 1 is a schematic diagram showing one type of body of the present invention.

This invention relates to an electrically heatable activated carbon body made of a monolithic structure which is either partially or wholly of activated carbon, and means in contact with the structure for conducting an electric current (direct or alternating) through the structure; and to a method for making and using the body.

Activated carbon differs from other types of carbon, e.g., pyrolized carbon by having a non-graphitic microcrystalline form of carbon which has been processed to produce a carbon with high porosity. The pores formed in the activated carbon can be macropores (e.g.m pores having a diameter of greater than about 500 angstroms), and mesopores (e.g., pores having a diameter between about 20 and 500 angstroms), but micropores (e.g., pores having a diameter less than about 20 angstroms) are always present in activated carbon, which adsorb various molecules. Activated carbon is characterized by a high specific surface area (e.g., 300 to 2500 $m^2/g$) and is known for its high adsorptive capability. Adsorption capability of activated carbon is derived from the micropores which are produced during activation. Other forms of carbon do not have micropores and therefore do not have any adsorption capability.

According to the present invention, advantage is taken of the conductive properties of carbon. With the passage of an electric current through the carbon, the carbon heats up to a predetermined temperature depending on the resistance of the body and the voltage applied. The body can be designed with resistance and voltage suitable for raising the temperature of the structure significantly above the desorption temperature of the adsorbed species. Therefore, depending on the species adsorbed, the temperature can be controlled in such a way as to cause desorption of the adsorbed species.

The present invention overcomes the disadvantages of carbon in the form of loose granules where as explained before, current can be unpredictable and irregular causing uneven heating. Having the activated carbon in the form of a monolithic or unitary cohesive structure according to the present invention affords the advantage of conducting an electric current predictably and uniformly therethrough, thereby extending the life of the body.

The monolithic structure according to this invention which can also be referred to as an activated carbon structure, can be in the form of an activated carbon coated non-conductive inorganic unitary substrate. Or it can be a unitary structure shaped entirely of activated carbon. The monolith has means for passage of a workstream through the body, e.g., a network of pores communicating from the outside to the inside, and/or thru channels extending from one end of the monolith to the other for passage of the workstream into one end and out through the other end.

In activated carbon coated substrates, the inorganic substrate has an outer surface from which pores extend into the substrate. The coating penetrates into and is distributed substantially throughout the pores of the inorganic substrate. The carbon in the pores is believed to form a coating on the walls of the pores, and as a result a workstream comes in contact with the activated carbon for adsorption of species carried in the workstream.

The substrate of the present invention can be made from any known non-electrically conducting inorganic material, and made by known process.

The only requirements are that the substrate have enough strength to function in the application, and have pores extending from its outer surface and be capable of withstanding the heat-treating temperatures seen in forming the activated carbon coating.

For example, in the case of particulate carbon-binder coatings, the substrate must have sufficient strength to withstand heat-treating temperatures. In the case of carbon precursors, the substrate must have strength to withstand carbonizing and activating temperatures.

It is desirable that the overall open porosity of the substrate be at least about 10%, preferably greater than about 25% and most preferably greater than about 40%. For most purposes, the desirable range of porosity is about 45% to about 55%. Preferably the pores of the substrate material create "interconnecting porosity" which is characterized by pores which connect into and/or intersect other pores to create a tortuous network of porosity within the substrate.

Suitable porous substrate materials include ceramic, glass ceramic, glass, and combinations thereof. By combinations is meant physical or chemical combinations, (e.g., mixtures, compounds, or composites.

Some materials that are especially suited to the practice of the present invention, although it is to be understood that the invention is not limited to such, are those made of cordierite, mullite, clay, talc, zircon, zirconia, zirconates, zirconia-spinel, magnesium aluminosilicates, spinel, alumina, silica, silicates, borides, alumino-silicates, eg., porcelains, lithium aluminosilicates, alumina silica, feldspar, titania, fused silica, nitrides, borides, carbides, eg., silicon carbide, silicon nitride or mixtures of these. Cordierite is preferred because its coefficient of thermal expansion is comparable to that of carbon, increasing the stability of the activated carbon body. Some typical ceramic substrates are disclosed in U.S. Pat. Nos. 4,127,691 and 3,885,977. Those patents are herein incorporated by reference as filed.

The substrate can take any known form including eg., tubes, foams, multicellular bodies or honeycombs. Typically, the substrate has open-ended channels for passage of a workstream in and out of the body. The substrate is preferably a honeycomb having a matrix of thin walls which form a multiplicity of open-ended cells extending between the ends of the honeycomb.

Some examples of honeycombs produced by the process of the present invention, although it is to be understood that the invention is not limited to these, are those having about 172 cells/cm$^2$ (1100 cells/in$^2$), about 94 cells/cm2 (600 cells/in$^2$), about 62 cells/cm$^2$ (400 cells/in$^2$), or about 47 cells/cm$^2$ (300 cells/in$^2$), those having about 31 cells/cm$^2$ (200 cells/in$^2$), or about 15 cells/cm$^2$ (100 cells/in$^2$), or about 2.5 cells/cm$^2$, (16 cells/in$^2$) or about 1.5 cells/cm$^2$ (9 cells/in$^2$).

Wall (web) thicknesses range typically from about 0.1 to about 1.3 mm (about 4 to about 50 mils) for most applications and it is to be understood that the invention is not limited to these dimensions. The external size and shape of the body is controlled by the application and is not limited to those described above. For example, other combinations of cell densities and wall thicknesses can be made.

Cordierite honeycombs are especially preferred as substrates for the activated carbon.

Preferably, the carbon coating is applied by contacting the substrate with a carbon precursor which is cured and carbonized, followed by activation of the carbon. The carbon precursor liquid penetrates into the interconnecting porosity of the substrate.

By carbon precursor is meant a carbon-containing substance that converts to continuous structure carbon on heating. For purposes of this invention, a carbon precursor is in the form of a solution or liquid at ambient temperatures or capable of being liquified by heating or other means, and suitable for penetrating through to the porosity of the substrate.

This type of coating is preferred because as a result of curing, carbonizing and activating, the carbon atoms are arranged in a continuous uninterrupted structure of random three dimensional graphitic platelets. The platelets have angstrom sized pores typically about 5 to about 50 angstroms for adsorption as distinguished from micron-size pores. Pores in several hundred micron size range can be present in the body, but they do not contribute to adsorption capacity. Upon curing and carbonizing, a coating is produced that is physically interlocked within the interconnecting porosity of the substrate.

One preferred body of this type is described in U.S. patent application Ser. No. 08/011,385, filed Jan. 29, 1993. That application is herein incorporated by reference as filed.

Carbon precursors useful in this embodiment of the present invention include any liquid or liquefiable carbonaceous substance. Examples of useful carbon precursors include thermoplastic resins (e.g., polyvinylidene chloride, polyvinyl chloride, polyvinyl alcohol, and the like), sugar solutions, furfuryl alcohol, and coal tar pitch.

Low viscosity carbon precursors (e.g., thermoset resins) are preferred because their low viscosity allows greater penetration of the carbon precursor into porous inorganic substrates. Phenolic resins are most preferred due to their low viscosity, high carbon yield, high degree of cross-linking upon curing relative to other precursors, and low cost. The carbon precursor liquid used in the present method can include a single precursor material or a mixture of two or more precursor materials. Optionally, activated carbon can be added to the carbon precursor liquid to increase the adsorptive capability of the activated carbon structure.

The contacting is done by any method suitable to bring the carson precursor in intimate contact with the inorganic substrate. Exemplary methods of contacting include dipping the substrate in the precursor solution (or liquid) or spraying the precursor solution (or liquid) directly on the substrate.

The eventual quantity of carbon formed on the substrate is dependent on the amount of carbon precursor retained by the substrate. The amount of carbon precursor retained by the substrate can be increased eg., by contacting the substrate with the precursor more than once and allowing the substrate to dry between contacting steps. In addition, the amount of precursor retained by the substrate can be controlled in porous substrates by simply modifying the overall porosity of the substrate (e.g., increasing porosity will increase the amount of precursor retained by the substrate and in turn the amount of carbon formed thereon).

The substrate and carbon precursor are then subjected to heat-treatments to cure the precursor and thereafter convert the precursor to continuous carbon (carbonize). The resulting carbon-coated substrate is then heat-treated to activate the carbon and produce an activated carbon structure.

The curing is accomplished typically by heating the coated substrate to temperatures of about 100° C. to about 200° C. for about 0.5 to about 5.0 hours. Curing is generally performed in air at atmospheric pressures. When using certain precursors, (e.g., furfuryl alcohol) curing can be accomplished by adding an acid catalyst at room temperature.

Carbonization is the thermal decomposition of the carbonaceous material, thereby eliminating low molecular weight species (e.g., carbon dioxide, water, etc.) and producing a fixed carbon mass and a rudimentary pore structure in the carbon.

Such conversion or carbonization of the cured carbon precursor is accomplished typically by heating the substrate to a temperature in the range of about 600° C. to about 1000° C. for about 1 to about 10 hours in a reducing or inert atmosphere (e.g., nitrogen, argon, etc.).

Curing and carbonizing the carbon precursor on the substrate results in a structure having a coating extending over the entire surface of the substrate in the form of a substantially uninterrupted layer of carbon. This carbon coating is anchored into the porosity of the substrate and as a result is highly adherent. The top surface of the carbon coating is an uninterrupted layer of carbon to carbon bonds.

As discussed above, if interconnecting porosity is present in the substrate, an interlocking network of carbon will be formed within the composition, resulting in an even more adherent carbon coating. The coating of uninterrupted carbon extending over the outer surface of the substrate formed provides a structure with advantages of high adsorptive capability despite a relatively low carbon content, high strength, and high use temperatures. Structures can be formed which contain carbon in an amount less than and up to about 50% often less than and up to about 30% of the total weight of the substrate and carbon.

The activated carbon coating of the above-described activated carbon structure is highly resistant to chipping and flaking, exhibits high strength and is highly resistant to high temperatures in comparison with carbon coatings produced by dipping a substrate in a slurry of activated carbon and binder. In addition, these carbon-coated structures exhibit adsorptive capabilities higher than extruded carbon structures or coated substrates where the coating is made directly from carbon. Because of these properties, the continuous coated structures are excellent candidates for receiving electrically conducting means and conducting a uniform current therethrough.

The activating is done to substantially enhance the volume and to enlarge the diameter of the micropores formed during carbonization, as well as to create new porosity. Activation creates a high surface area and in turn imparts high adsorptive capability to the structure. Activation is done by known methods such as exposing the structure to an oxidizing agent such as steam, carbon dioxide,, metal chloride (e.g., zinc chloride), phosphoric acid, or potassium sulfide, at high temperatures (e.g., about 600° C. to about 1000° C.).

In another embodiment, the activated carbon coating can be applied by the conventional technique of contacting a slurry of activated carbon particles and binder such as thermoplastic or thermosetting resin binder with the substrate. These binders can be carbonized to obtain a continuous carbon coating. Binders have to be in such proportion that conductivity of the carbon is not affected. Too much binder can coat particles of carbon and binder system has high resistance to electricity, it can cause hot spot problems.

The activated carbon coated structure is then provided with electrically conducting means to form the product electrically heatable activated carbon body. The electrically conducting means are positioned so as to be able to conduct an electric current through the structure or more particularly, the carbon, to heat the carbon uniformly. The actual positioning of the conducting means depends on the type of means and on the geometry of the structure and the invention is not limited to any specific type of conducting means or geometry as long as the current generates uniform heating of the structure without hot spots.

In general, the conducting means must provide a resistivity of at least about 0.001 ohm.cm, but typically at least about 0.01 ohms, and most typically at least about 0.10 ohm.cm. For most purposes of the present application, the resistivity is between about 0.10 ohm.cm and 25 ohm.cm.

For the purposes of the present invention resistivity of the body is defined by the formula:

$$\rho = \frac{R \cdot A}{L}$$

where p is the resistivity in ohm.cm, R is the resistance in ohms, A is the area of a conducting surface in $cm^2$, and L is the distance between two conducting surfaces in cm.

The voltage and current requirement will vary depending on the application and the resistivity can be adjusted as desired according to the above equation. For example, if the body is to be heated in an oxygen containing atmosphere, such as air for automotive applications, the voltage and current should be such as to raise the temperature so that no spot in the body is higher than about 350° C. If the body is to be heated in an inert or non-reacting atmosphere, e.g., $N_2$, the voltage and current should be such as to raise the temperature so that no spot in the body is higher than about 1000° C.

Some especially preferred conducting materials are metals as copper, silver, aluminum, zinc, nickel, lead, tin and their alloys, with the preferred being copper because of its high conductivity which minimizes resistance, and because it is inexpensive.

The conducting means is typically either in the form of a strip of the conducting material or electrode or a coating of conductive material on the monolith structure. In this invention, the term "conductive coating" refers to the coating which is applied to the activated carbon structure and is thereby differentiated from the carbon coating in carbon coated structures.

If an electrode is used, it can be applied by pressure contact e.g., a spring. Or a strip of conducting metal can be used and be attached to the structure by an eletrically conducting adhesive such as e.g., silver-containing epoxies such as E-solder #3012 and #3021 from Acme Chemicals and Insulation Co.

A conductive coating is cost effective and gives a uniform resistance path so as to avoid hot spots.

One especially suitable geometry is having the conducting metal applied to opposing surfaces of the body. By opposing surfaces is meant surfaces that are so spaced according to the geometry of the body that passage of current between the conductive surfaces produces a current that heats the carbon uniformly.

A preferred shape of the monolith is a honeycomb e.g., a carbon coated honeycomb from a carbon precursor, of rectangular shape with the conductive coating on two opposite faces as shown in FIG. 1.

In FIG. 1, the product body (10) having a rectangular honeycomb shape is equipped with a conductive metal coating (12) copper on opposite closed sides of an activated carbon containing honeycomb (14), which can be any of the types described, e.g., activated carbon coated substrate or shaped activated carbon. Leads (40) are shown connecting the metal coated sides (12) with a power supply. For measuring resistivity, the distance between conducting surfaces (12) is shown as L, and the area of a conducting surface would be the area of one side (12).

Figure 2:
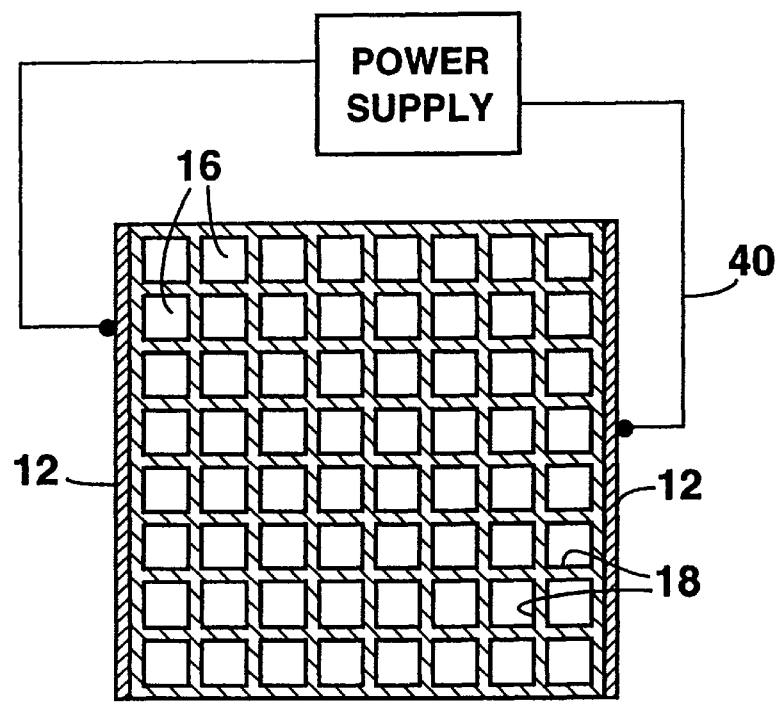
FIG. 2 is a horizontal cross section of the body of FIG. 1.

FIG. 2 is a horizontal cross section of the product body of FIG. 1 through section 2—2, which shows the conductive coating on the sides and the honeycomb channels or cells (16) and the cell walls (18).

Figure 3:
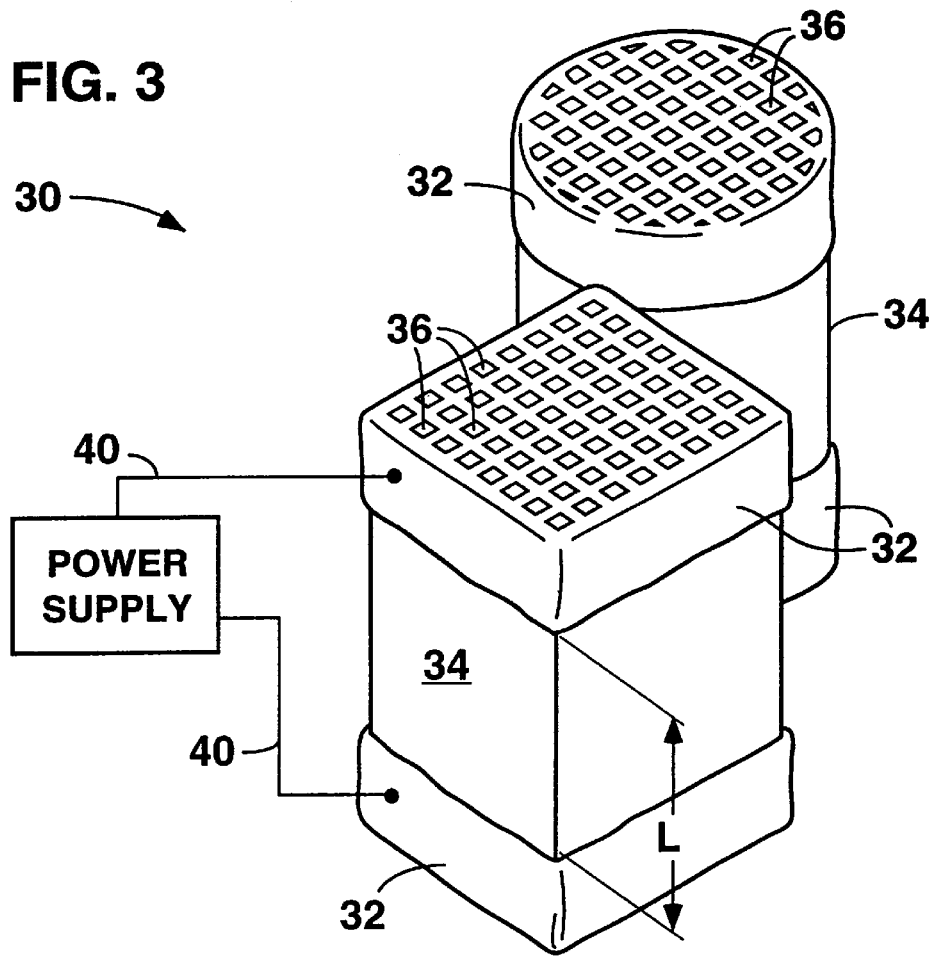
FIG. 3 is a schematic diagram showing various shapes of the bodies of the present invention.

FIG. 3 shows the product body in various honeycomb shapes (cylindrical and rectangular) (30). Each body is equipped with a conductive metal coating (32) on opposite open ends of the activated carbon containing honeycomb (34). Leads (40) are shown connecting the metal coated ends (32) with a power supply. Distance between conducting ends is shown as L, and the area of a conducting surface would be the coated area of one of the conductive coatings (32).

Figure 4:
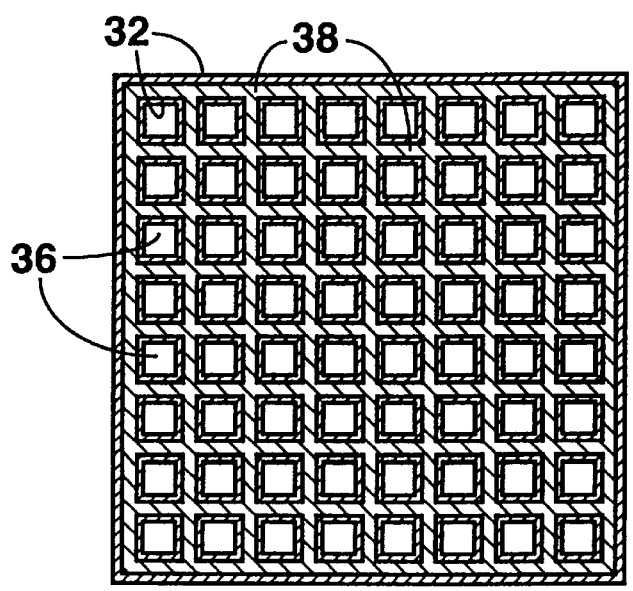
FIG. 4 is a horizontal cross section of one of the bodies shown in FIG. 3.

The conductive coatings extend inside the monolith structure and cover the cell walls down a portion of the length of the walls. The length covered by the coating can vary but rust be sufficient to distribute current uniformly across the body. This extension of the conductive coatings is shown in FIG. 4 which is a horizontal cross section of the rectangular honeycomb of FIG. 3 through section 4—4. The conductive coating (32) is shown covering the cell walls (38) which separate the honeycomb cells (36).

Other possible body shapes and coating configurations are rectangular faced or cylindrical honeycombs having the conductive coating in the form of stripes along the closed sides, or ringed around sides at the open ends, or on the open ends, or completely on the outside of the structure with another contact being made to the inside of the structure eg., at the center. The above are only illustrative and are not meant to be limiting. Such will depend on the nature of the application and factors such as e.g., cost, space, temperature, etc. The requirement is that a low resistance, mechanically stable system is achieved.

The conductive coating can be applied by any known suitable technique such as frit bonding, arc spraying, flame spraying, plasma spraying, ultrasonic soldering, painting, etc.

The invention is not limited to any specific thickness of the coating. Thickness depends on the nature of the coated surface and the coating metal. The coating must be thick enough to provide a good low resistance current path, and to last, that is be resistant to oxidation and corrosion and to have good mechanical stability. However the coating should not be so thick as to chip or flake off or be prohibitively expensive.

One especially suitable conductive coating technique involves first ensuring that the activated carbon coated surface is smooth. This is usually done by grinding the activated carbon coated surface until flat and smooth. If the surface is rough it is ground on a 600 grit sandpaper. The conductive coating is then applied over the smooth activated carbon coating. Some useful techniques for applying the conductive coating are described below.

One technique is by forming a coating mixture of copper metal powder and glass frit, with a typical copper to frit weight ratio of about 10:1 to 2:1, and more typically about 6:1 to 2:1. For example some typical copper-frit compositions are 70 wt. % Cu and 30 wt. % frit or 84% copper and 16 frit %. The coating is then fired.

Arc spraying is a suitable technique. Arc spraying is done by passing two metallizing wires through a wire feeder and an arc spray gun. Electric current creates an arc between the wires. A high heat zone is created by the arc which melts the wires, and compressed air blows molten metal onto the substrate to be coated resulting in the deposition of a durable coating.

Another technique is to provide a solder, e.g., of silver, nickel or other suitable conductive coating and to apply it by the methods described above including ultrasonic soldering.

Some especially useful coating techniques are described in the illustrative examples that follow.

In accordance with another embodiment, the carbon structure can be made totally of activated carbon and having porosity for passage of a workstream through, with the preferred shape being a honeycomb as described previously. Such structures can be made by conventional forming techniques as molding, or shaping a plasticized mixture of activated carbon particles and binders, e.g. soluble organic binders and/or resins, etc. e.g. by extrusion, and heat-treating. Some shaped activated carbon structures that are suited are for example, described in U.S. Pat. Nos. 4,399,052, 5,043,310, 4,999,330, and 4,518,704, among others, and in U.S. Pat. No. 5,510,063, Apr. 23, 1996, and U.S. Pat. application Ser. No. 08/228,265, filed Apr. 15, 1994, now abandoned. The conducting means on these structures is the same as what was previously described for the activated carbon coated structures.

The bodies of the present invention are suited for use in any of a wide variety of applications for which activated carbon bodies have been used in the past. Examples of such applications include residential water purification, volatile organic compound emission control, natural gas fuel storage for gas-powered vehicles or equipment, indoor air purification, industrial respirators, automotive cabin air filters, ventless hoods, chemical separations, $NO_x$ and $SO_x$ control, and exhaust traps for automotive cold start applications. Other potential applications include use as ozone filters, mercury collection from municipal incinerators, radon adsorption, automotive gas tank or intake manifold emissions, sewer pump vents, oil-air separations, or any other application wherein adsorption of a component or components from a fluid stream is desired.

As an example of improving the quality of automotive cabin air, the body can be installed under the automobile hood near the wipers at the fresh air inlet to the HVAC system. A suitable body would be an activated carbon coated honeycomb having about 62-cells/cm$^2$ and measuring about 25 cm×25 cm×4 cm thick. After a predetermined mileage (e.g., under 3,000 miles) or operating time or volumetric flow, a controller would send current through the body and heat it up to regeneration temperature long enough to release adsorbed hydrocarbons. The fan would run in the reverse direction blowing the hydrocarbons into the outside air.

To more fully illustrate the invention, the following non-limiting examples are presented. All parts, portions, and percentages are on a weight basis unless otherwise stated.

EXAMPLE 1

A honeycomb having about 62 cells/cm$^2$ (400 cells/in$^2$) measuring about 14 cm (about 5.5") long and about 7 cm (about 2.75") in diameter, having a wall thickness of about 0.15 mm (6 mil), and having about 17% carbon based on the honeycomb was coated with phenolic resin. The resin was then cured at about 150° C. for about 30 minutes and carbonized at about 900° C. for about 6 hours in nitrogen. The carbon was then activated in $CO_2$ at about 900° C. for about 2 hours and cooled to about 25° C. To diagonally opposite ends of the honeycomb thin copper strips measuring about 6 mm wide×about 38 mm long (about 1/4" wide×1½" long) were cemented with a conductivity glue on the skin. The resistance of the honeycomb was about 0.73 ohms. A voltage of about 6 volts was applied to the honeycomb and the temperature inside the honeycomb was measured by a thermocouple. At about 6V-10 amp current the thermocouple measured about 135° C. at a point of about 2.54 cm (about 1") inside the honeycomb from one face. The temperature near the copper strip connections inside the honeycomb was about 166° C. These results show that electrically heatable carbon coated honeycombs produced according to the present invention have sufficient resistivity so that they can be heated to the appropriate temperatures.

EXAMPLE 2

The procedure of Example 1 was repeated but at about 15 amp current. The temperature at the center, approximately 5.1 cm (about 2") inside the honeycomb, reached about 240° C. in about 3.5 minutes. The polymer conductivity glue holding the copper strips started to burn so the experiment was discontinued. The voltage was about 8.4 volts at about 15 amps.

The following examples illustrate control of carbon coating percent which in turn controls the electrical resistance of the honeycomb and consequently it's heating behavior. The examples also illustrate various procedures for applying permanent and durable metal contacts as opposed to the mechanical contacts in Examples 1 and 2.

EXAMPLE 3

A honeycomb with 31 cells/cm$^2$ (200 cells/in$^2$), coated with activated carbon by the same procedure as described in Example 1, and having about 4% carbon, was cut to 324 mm$^2$ cross section and 25 mm length. The two opposing sides of the honeycomb were ground flat and painted with conductive silver paint (slurry of silver particles in a paint/glue solution) obtained from E.I. Dupont Co, Wilmington, Del. The sample was then heated in nitrogen atmosphere to 300° C. for half an hour to sinter the silver into a continuous layer to give a coated body as shown in FIG. 1. The resistance of this sample measured by point contact before the silver coating was 62.9 ohms. After the coating the point contact measured resistance was 7.2 ohms indicating that the magnitude of contact resistance is very high and has to be minimized by a high conductivity coating.

A 3 volt potential was applied across this coated sample. The temperature levelled off at 70° C. in 250 seconds and was uniform across the sample. The resistivity was about 18 ohm.cm.

EXAMPLE 4

A carbon coated honeycomb similar to the one in Example 3 was prepared except that the sides were not ground flat. Such a sample has a rough surface because of the cell walls on the surface. When an attempt was made to apply potential across the sample, sparking occurred. The experiment was discontinued. This example illustrates that uniform good contact across the surface is necessary to heat the samples electrically.

EXAMPLE 5

A carbon coated honeycomb similar to that in Example 3, and having 8.9% carbon was coated with silver paint as in Example 3. The resistance measured was 2.8 ohms. When a 3 volt potential was applied across the honeycomb the honeycomb heated up to 135° C. in 250 seconds and the temperature stabilized. An increase in the amount of carbon decreased the resistance and increased the temperature compared to the honeycomb in Example 3. The resistivity of this sample was about 7 ohm.cm.

EXAMPLE 6

A carbon coated honeycomb similar to that in Example 3, and having 18% carbon coating when treated similar to Example 3 had a resistance of 0.6 ohms and on applying 3 volt potential heated up to 220° C. in 90 seconds. The resistivity of this sample was about 1.5 ohm.cm.

EXAMPLE 7

A honeycomb with about 62 cells/cm$^2$ (400 cells/in$^2$) coated with carbon as in Example 1 and having about 12.5% carbon was coated with silver paint in the same manner as the sample of Example 3. A 3 volt potential difference was applied across the honeycomb. The sample heated up to 190° C. and stabilized at that temperature in 275 seconds. The resistivity of this sample was about 3.25 ohm.cm.

Silver paint applied to minimize contact resistance was not very durable but can be made durable if the temperature of the paint/glue base was rated for the high temperature in the contact area.

Higher durability contacts were produced by two methods which are described in Examples 8–11.

The first method utilized arc spray method.

The second involved a frit bonding method.

EXAMPLE 8

A carbon coated honeycomb similar to that in Example 3, and having about 16.8% carbon with the same dimensions as in Example 3 was coated with copper on two opposite faces by the arc spray technique. The copper coating was very uniform in thickness and strongly adhered to the surface. The resistance of the honeycomb as measured with a point contact before coating was 5.8 ohms. After the coating, the point contact resistance was 0.5 ohms. The honeycomb heated up to 230° C. in 90 seconds with 3 volt potential. The resistivity of the sample was about 1.25 ohm.cm.

EXAMPLE 9

A honeycomb substrate identical to that in Example 4 was coated with aluminum by arc spraying and attained a temperature of 200° C. in 120 seconds.

EXAMPLE 10

A honeycomb identical to that in Example 5 was coated with nickel by arc spraying. With 3 volt potential difference the sample heated up to 225° C. in 90 seconds.

EXAMPLE 11

Honeycombs with about 62 cells/cm$^2$ (400 cells/in$^2$) coated with activated carbon as in Example 1 and having about 14.9% carbon as a coating were coated with a mixture of fine copper powder and glass binder from Ferro. The copper powder from U.S. Bronz Powders Inc. was mixed with EG2798 frit from Ferro in two compositions: (1) 16% frit-84% copper, and (2) 23% frit and 77% copper. The two compositions were each mixed with a polymeric binder polyacetylene carbonate from Air Products Corp and painted onto the activated carbon coated honeycombs. The honeycombs were then fired in nitrogen to remove the binder and sinter the frit at 550° C. for 30 minutes. The fired samples had a strongly adhered coating of copper and frit.

At an applied voltage of 3 volts the honeycombs coated with compositions (1) and (2) heated up to 200° C. in 120 seconds and 225 seconds respectively.

This example shows that heat-up temperature and heating rate can be controlled by changing the frit to metal ratio.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A body comprising
a non-metallic monolithic structure comprising activated carbon and having means for passage of a workstream therethrough, wherein the structure is a non-electrically conducting monolithic inorganic substrate coated with a continuous uninterrupted layer of activated carbon, wherein activated carbon is derived from a carbon precursor; and
conducting means on the structure for conducting an electric current through the structure.

2. A body of claim 1 wherein the monolithic structure is in the form of a honeycomb.

3. A body of claim 1 wherein the conducting means is an electrically conducting coating of metal on two opposing surfaces of the structure.

4. A body of claim 3 wherein the metal coating is selected from the group consisting of copper, aluminum, silver, zinc, nickel, lead, tin, and alloys thereof.

5. A body of claim 4 wherein the metal coating is copper.

6. A body of claim 3 wherein the metal coating has a thickness sufficient to result in a resistivity of at least about 0.001 ohm.cm.

7. A body of claim 6 wherein the resistivity is at least about 0.01 ohm.cm.

8. A body of claim 7 wherein the resistivity is at least about 0.10 ohm.cm.

9. A body of claim 11 wherein the inorganic substrate is made of material selected from the group consisting of ceramic, glass ceramic, glass, and combinations thereof.

10. A body of claim 9 wherein said material is ceramic material.

11. A body of claim 10 wherein said material is cordierite.

12. A body of claim 2 wherein the substrate is cordierite honeycomb, the conducting means is an electrically conducting metal coating on two opposing surfaces of the carbon coated honeycomb, the metal being selected from the group consisting of copper, aluminum, silver, nickel, lead, tin, and alloys thereof, and the metal coating has a thickness sufficient to result in a resistivity of at least about 0.001 ohm.cm.

13. A body of claim 12 wherein the metal is copper.

14. A body of claim 12 wherein the resistivity is at least about 0.01 ohm.cm.

15. A body of claim 14 wherein the resistivity is at least about 0.1 ohm.cm.

16. A method of making an electrically heatable activated carbon body, said method comprising:
a) providing a non-metallic monolithic structure comprising activated carbon, and having means for passage of a workstream therethrough, wherein the structure is a non-electrically conducting monolithic inorganic substrate coated with a continuous uninterrupted layer of activated carbon, wherein activated carbon is derived from a carbon precursor; and
b) providing conducting means on the structure for conducting an electric current through the structure.

17. A method of claim 16 wherein the inorganic substrate is provided as a honeycomb structure.

18. A method of claim 16 wherein the inorganic substrate is made of material selected from the group consisting of ceramic, glass ceramic, glass, and combinations thereof.

19. A method of claim 18 wherein said material is ceramic material.

20. A method of claim 19 wherein said material is cordierite.

21. A method of claim 16 wherein the electrically conducting means is provided by applying an electrically conducting coating of a metal on two opposing surfaces of the monolithic structure.

22. A method of claim 21 wherein the metal coating is provided at a thickness sufficient to result in a resistivity of at least about 0.001 ohm.cm.

23. A body of claim 22 wherein the resistivity is at least about 0.01 ohm.cm.

24. A body of claim 23 wherein the resistivity is at least about 0.10 ohm.cm.

25. A method of claim 21 wherein the metal is selected from the group consisting of copper, aluminum, silver, zinc, nickel, lead, tin, and alloys thereof.

26. A method of claim 25 wherein the metal coating is copper.

27. A method of claim 16 wherein the activated carbon coating is provided by
a) coating the inorganic substrate with a carbon precursor;
b) curing the carbon precursor;
c) carbonizing the cured carbon precursor to form a uniform coating of carbon on the substrate; and
d) activating the carbon.

28. A method of claim 21 wherein the carbon precursor is a thermosetting resin.

29. A method of claim 27 wherein the substrate is a ceramic honeycomb, the electrically conducting means is provided by applying an electrically conducting coating of a metal on two opposing surfaces of the honeycomb, the metal being selected from the group consisting of copper, aluminum, silver, zinc, nickel, lead, tin, and alloys thereof, and the metal coating is provided at a thickness sufficient to result in a resistivity of at least about 0.001 ohm.cm.

30. A method of claim 29 wherein the ceramic is cordierite.

31. A method of claim 29 wherein the metal coating is copper.

32. A method of claim 29 wherein the resistivity is at least about 0.01 ohm.cm.

33. A method of claim 32 wherein the resistivity is at least about 0.10 ohm.cm.

34. A method for desorbing adsorbed species from an activated carbon body, the method comprising:
 a) providing an electrically heatable activated carbon body having adsorbed species, wherein the activated carbon body comprises a monolithic activated carbon structure having means for passage of a workstream therethrough, and conducting means on the structure for conducting an electric current therethrough, wherein the structure is a non-electrically conducting monolithic inorganic substrate coated with a continuous uninterrupted layer of activated carbon, wherein activated carbon is derived from a carbon precursor; and
 b) passing an electric current through the structure to raise the temperature thereof above the desorption temperature of the adsorbed species whereby the adsorbed species desorb and pass out of the structure.

35. A method of claim 34 wherein the monolithic structure is provided as a honeycomb.

36. A method of claim 34 wherein the conducting means is provided as an electrically conducting coating of metal on two opposing surfaces of the structure.

37. A method of claim 36 wherein the metal coating is selected from the group consisting of copper, aluminum, silver, zinc, nickel, lead, tin, and alloys thereof.

38. A method of claim 37 wherein the metal coating is copper.

39. A method of claim 36 wherein the metal coating is provided at a thickness sufficient to result in a resistivity of at least about 0.001 ohm.cm.

40. A method of claim 39 wherein the resistivity is at least about 0.01 ohm.cm.

41. A method of claim 40 wherein the resistivity is at least about 0.10 ohm.cm.

42. A method of claim 34 wherein the activated carbon coating is provided by
 a) coating the substrate with a carbon precursor;
 b) curing the carbon precursor;
 c) carbonizing the cured carbon precursor to form a uniform coating of carbon on the substrate; and
 d) activating the carbon.

43. A method of claim 42 wherein the carbon precursor is a thermosetting resin.

44. A method of claim 42 wherein the substrate is a ceramic honeycomb, the electrically conducting means is provided by applying an electrically conducting coating of a metal on two opposing surfaces of the honeycomb, the metal being selected from the group consisting of copper, aluminum, silver, zinc, nickel, lead, tin, and alloys thereof, and the metal coating is provided at a thickness sufficient to result in a resistivity of at least about 0.001 ohm.cm.

45. A method of claim 44 wherein the ceramic is cordierite.

46. A method of claim 45 wherein the metal coating is copper.

47. A method of claim 44 wherein the resistivity is at least about 0.01 ohm.cm.

48. A method of claim 47 wherein the resistivity is at least about 0.10 ohm.cm.

* * * * *

UNITED STATES PATENT AND TRADEMARK OFFICE
CERTIFICATE OF CORRECTION

PATENT NO. : 6,097,011
DATED : August 1, 2000
INVENTOR(S) : Gadkaree et al.

It is certified that error appears in the above-identified patent and that said Letters Patent is hereby corrected as shown below:

Column 12, claim 9,
Line 1, "A body of claim 11" should be -- A body of claim 1 --.

Column 13, claim 28,
Line 1, "A method of claim 21" should be -- A method of claim 27 --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*